United States Patent [19]

Gudat et al.

[11] Patent Number: 4,827,415
[45] Date of Patent: May 2, 1989

[54] ELECTROPNEUMATIC DOOR CONTROL SYSTEM

[75] Inventors: Wolfgang Gudat, Hanover; Peter Liermann, Barsinghausen; Jürgen Binarsch, Haste, all of Fed. Rep. of Germany

[73] Assignee: WABCO Fahrzeugbremsen GmbH, Hanover, Fed. Rep. of Germany

[21] Appl. No.: 466,685

[22] Filed: Feb. 15, 1983

[51] Int. Cl.$^4$ .............................................. G06F 15/20
[52] U.S. Cl. .................................. 364/424.05; 187/103
[58] Field of Search ................. 364/425, 174, 424; 187/29 R, 31, 48, 51, 52 R, 103; 49/26-31, 360; 91/356, 392, 459; 180/281, 282, 286, 271

[56] References Cited

U.S. PATENT DOCUMENTS

| | | | |
|---|---|---|---|
| 2,832,588 | 4/1958 | Newkirk | 49/27 |
| 4,300,661 | 11/1981 | Hmelovsky | 187/103 |
| 4,300,663 | 11/1981 | Hmelovsky et al. | 187/103 |
| 4,342,379 | 8/1982 | Games et al. | 187/103 |
| 4,376,971 | 3/1983 | Landgraf et al. | 49/28 |
| 4,476,678 | 10/1984 | Hall | 49/360 |
| 4,478,131 | 10/1984 | Liermann et al. | 180/271 |

*Primary Examiner*—Gary Chin
*Attorney, Agent, or Firm*—G. E. Hawranko

[57] ABSTRACT

An electropneumatic door control, particularly for the control of doors in public transportation, which includes for the purpose of detecting the respective position of the door linear motion sensors (1, 2) which are mounted on the pneumatic door cylinders (4, 5) or on the axes of rotation of the door wings, and whose output signals are evaluated by electronics (3). The electronics (3) include a computer which automatically detects the end positions as well as the motion behavior of the door or obstructions, respectively, and triggers a monitoring function, if necessary. The proposed door control increases reliability and eliminates previously used limit switches and electropneumatic differential pressure switches.

6 Claims, 3 Drawing Sheets

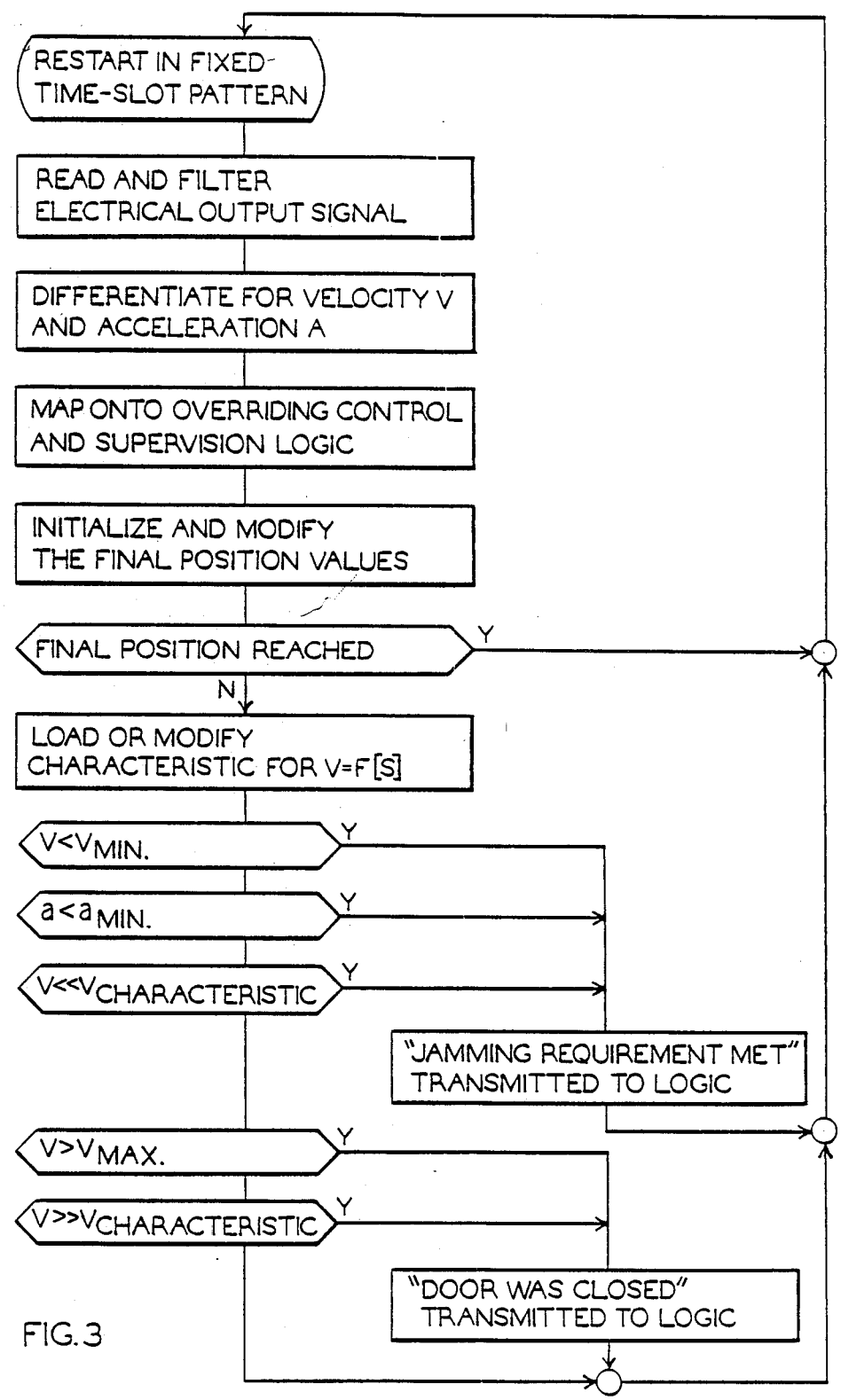

4,827,415

ELECTROPNEUMATIC DOOR CONTROL SYSTEM

BACKGROUND OF THE INVENTION

The invention pertains to an electropneumatic door control system for use on public transportation vehicles serving the transport of passengers, as for example buses. The controls are usually pneumatically or electropneumatically actuated, i. e. the driver triggers, for the purpose of opening or closing the door, a pneumatic or electropneumatic pulse which applies compressed air via a door valve in the form of a control valve to a door drive designed as door cylinder, and where the stroke movements of the door cylinder piston initiate the opening and closing of the door.

Since the most varied operating conditions have to be taken into account, particularly also mishandling by the passengers, the control must meet a number of marginal conditions. It is therefore a general demand, for example, that the closing motion of a pneumatically operated vehicle door automatically changes into an opening motion in the event that persons or objects are being squeezed in a closing door (reversing). The same applies for aggravated operating conditions which might occur, for instance, during the winter semester when the kinematics of the door change due to lower temperatures and when the closing motion of the door might be impeded as a result of snow or ice clumps. Due to the fact that even with the opening motion there is a danger that persons or objects get stuck, it is furthermore common practice to provide such a device for opening doors as well. In this instance, an electropneumatic switching arrangement merely causes the door to stop by a pressure release in the system, since here a reversal of the door motion would present a hazard for the people going through the door next.

A door control of this type was proposed, for example, in the German patent application No. P 30 32 516 (U.S. assignee's U.S. copending application Ser. No. 295,393) U.S. application has matured into U.S. Pat. No. 4,478,131. The system described there is provided with several electrical limit switches as well as electropneumatic differential pressure switches for the purpose of sensing the door positions and door behavior, e.g. meeting with obstacles. As is the case with all mechanical parts, these switches are subject to wear and tear. And furthermore, the mounting and adjustment of the limit switches as well as the pressure regulation for the differential pressure switches presents problems.

It is further known (DE-OS No. 30 03 877) to monitor the movement of the vehicle doors by presetting certain time intervals within which the closing or opening door should have reached a certain position. In this case the individual positions of the door are being scanned by reed switches or light barriers. If, due to some type of catch, the door does not reach one of these positions within the proper time, then the reversal procedure is triggered or the movement halted. The respective comparison between door position and time elapsed is executed in an electronic system which is in a discrete logic pattern and essentially contains timing elements.

One of the disadvantages of this known door control lies in the fact that relatively many reed switches or light barriers are required if a quick reaction of the reversal in all positions is to take place during the stroke of the door. Should the sensing of the door movement be too rough, as can occur when the distance between the sensing devices is large, then a relatively long time elapses until the reversal takes place, if in the most unfavorable case a door wing is being obstructed at the beginning of a monitoring period. Although this may be improved by increasing the number of reed switches or light barriers. However, this increases the cost for these components and also for the correspondingly higher number of timing elements within the electronic system. And furthermore, the expenditure is considerable which is required for the time adjustment of the timing elements for non-linear door movements.

Another disadvantage is that after the timing elements have been regulated the standard movement of the door wings is fixed and does not adapt to the changing operating conditions occurring in practical application. During the winter months, for example, as a result of the changed kinematics of the door they might have such an effect that the actual movement is slowed down as compared to the standard motion. A slower movement might also occur after the emergency cock has been actuated when the system is repressurized at a throttled pace.

SUMMARY OF THE INVENTION

The object of the invention, therefore, is to provide a door control system which accurately determines the position of the door, evaluates the motion characteristics of the door movement, initiates a proper action based on the above information, and performs all of the above at a minimum cost, with a minimum number of elements and over a varied range of climatic conditions.

Briefly, the preferred embodiment of the invention consists of two linear motion sensors, each having a slider portion mounted on the piston rods of two respective door cylinders. An electronics package provides a constant voltage to one side of the motion sensors, while the other side is connected to a reference ground. Movement of the door cylinder which causes movement of the slider portion, results in a change in the voltage measured at the slider portion. By connecting the slider to the electronics package, this change in voltage can be evaluated and a correct action initiated by the electronics package based on this evaluation.

BRIEF DESCRIPTION OF THE DRAWING

The invention is explained in more detail in the following with the help of an example illustrated in a drawing. Shown in the block diagram are:

FIG. 3 is a diagrammatic representation of the operating steps associated with the electronic logic unit.

DESCRIPTION AND OPERATION

Figure 1:
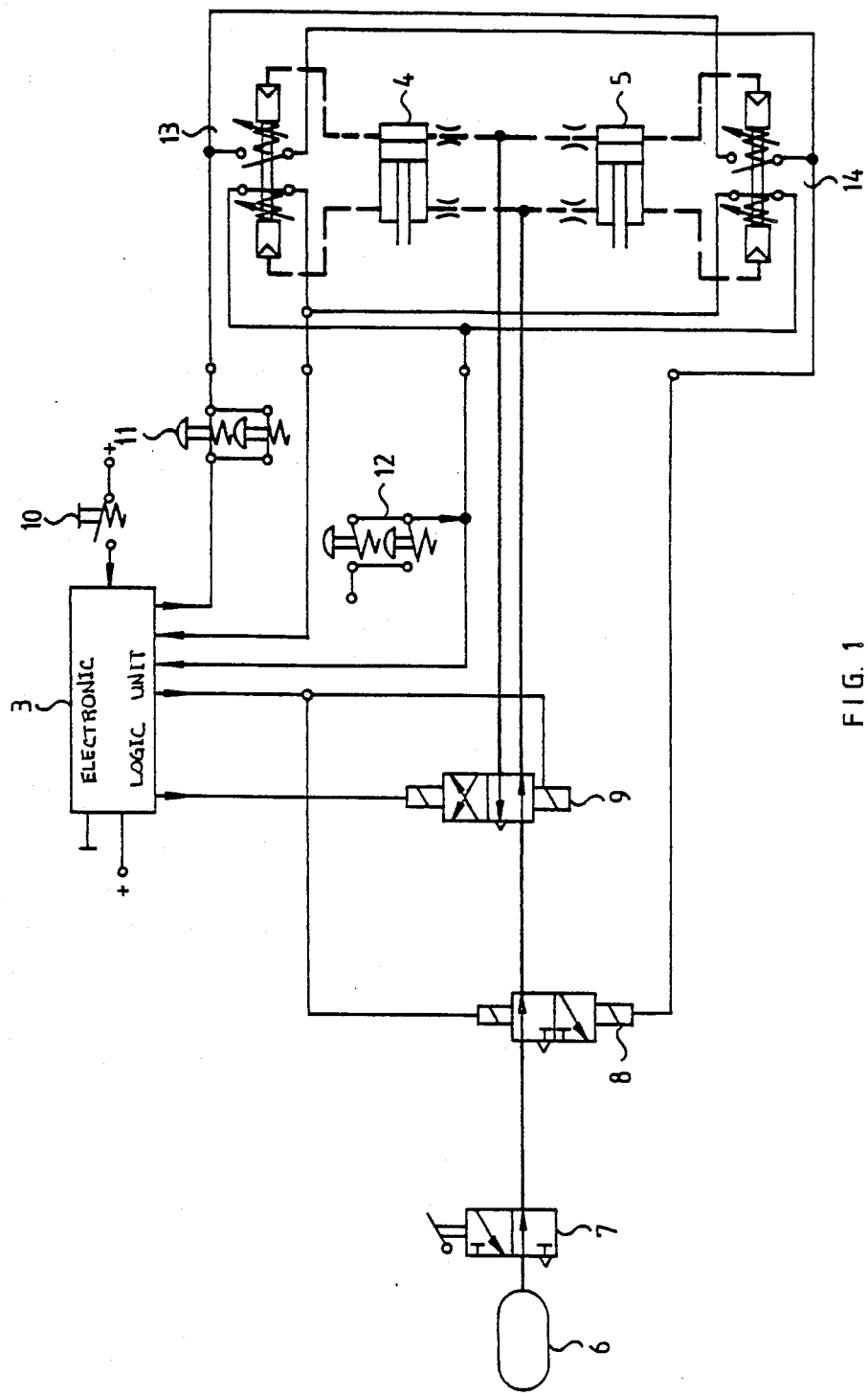
FIG. 1 a door control according to the state of the art.

The door control shown in FIG. 1 as per the state of the art was taken from the above mentioned copending U.S. patent application Ser. No. 295,393, which has matured into U.S. Pat. No. 4,478,131. Essentially it comprises a compressed air reservoir 6, an emergency cock 7, a shutoff valve 8, a door valve 9, and two pneumatic working cylinders 4, 5. The pressure space of the working cylinders 4, 5 is connected to electropneumatic differential pressure switches 13, 14. The working cylinders 4, 5 are connected with one wing each (not shown)

of a vehicle door. For sensing the end positions of the door wings there are limit switches 11, 12. The door reversal on the part of the driver is effected with a key 10. All of the electric switching signals for the control of the door system are produced by the electronic system 3 or passed on to same, respectively.

The exact functioning of this door system is described in detail in the copending U.S. application Ser. No. 295,393, which hereby incorporated by reference, and which has matured into U.S. Pat. No. 4,478,131.

Figure 2:
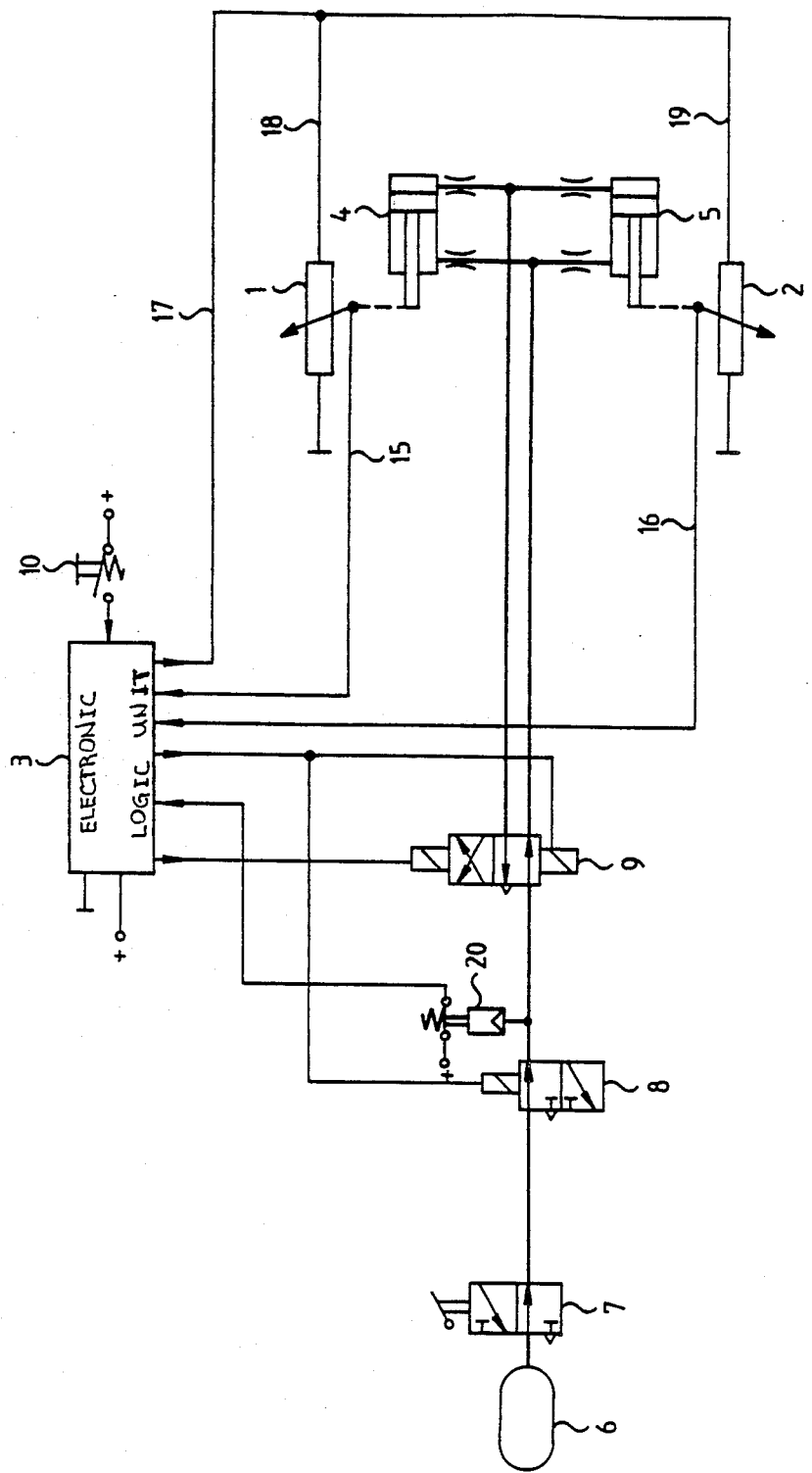
FIG. 2 a door control according to the invention.

FIG. 2 illustrates an example of the door control as per the invention.

The limit switches as well as the differential pressure switches were eliminated. For the sensing of the positions and the movement behavior of the door wings there are now provided two linear motion sensors 1, 2. One slider each of these motion sensors is mounted on a piston rod of a door cylinder 4, 5. The linear motion sensors are supplied from the electronics 3 via lines 17, 18, 19 with a stabilized supply voltage (constant voltage) and at the other end are connected to ground. The pick-ups or sliders of the motion sensors are connected to the electronics 3 across lines 15, 16. The voltage applied on the lines 15, 16 is a measure for the respective position of the door wings.

Instead of linear potentiometers, rotary pentiometers may be employed which are mounted on a hinge of the door (not shown). Furthermore, the motion sensors may be of a non-contact design for longer life. However, they must give an analog output signal.

As an alternate, the motion sensors 1, 2 may also be supplied with a constant current via lines 15, 16. This eliminates the lines 17, 18, 19 (not shown). The voltage developing on lines 15, 16 is collected in the electronics 3 and is a measure for the respective position of the door wings.

Finally, the motion sensors 1, 2 may also be supplied with a constant voltage via lines 17, 18, 19 while at the same time connecting the sliders to ground, so that lines 15, 16 are eliminated. The ensueing current is evaluated within the electronics by means of a precision resistor which at the same time serves as a current limiter. A voltage signal is produced whose non-linearity is taken into consideration during further processing in the electronics. A constant-current generator is not required in that case.

From the signals of the motion sensors 1, 2 the electronics 3 determine the position of the doors including the end positions as well as—after differentiating—also the door wing speed and acceleration or retardation, respectively. To this purpose, the electronics 3 include a computer, a microcomputer, for example.

With the help of the computed data the motion of the door wings in both directions is then monitored. In the event that irregularities caused by obstacles occur in the door action prior to reaching the end positions, this is being recognized by the electronics 3 due to corresponding irregular speed and acceleration values.

To this purpose, the computer contains a memory which stores for the respective sensed door position the corresponding standard door velocity. A comparison between the measured door velocity and the standard door velocity is then made. If the resulting difference is too great of the standard door velocity as opposed to the actual door speed, the logic triggers a so-called monitoring function. This causes the door to reverse when it is closing and depressurizes when the door is opening. This guarantees a sensitive reaction to obstructions.

According to a further development, the computed delay of the door is monitored simultaneously. Is the value too high (exceeding a threshold), the monitoring function is triggered once again. Measuring the door delay as a fraction of voltage change rather than presence detection has the advantage that the movement the door is being monitored even more sensitively. The monitoring alone of the door delay is not sufficient, however, since during a slow, sluggish braking of the door it would not be possible to reach the delay threshold.

In addition to the delay, the acceleration of the door is being monitored as well. An acceleration in the direction of opening or closing occurs when the door is being manually moved or pushed. After that the door will stop for a short time or is greatly delayed, respectively, until the pressure within the drive cylinders has once again built up corresponding to the position of the door and the door then continues to move until it reaches its end position. The sliding or pushing does ot have any other negative results. The computer has to detect it, though, so that the monitoring function—which otherwise would react because of wrong speed and delay of the door—can be rendered ineffective for a short period.

Another mishandling by passengers is holding the door open or shut when it is open or closed, respectively. In this case the computer triggers the monitoring function if after a certain interval following a reversal, i. e., after the driver actuated the key 10, a minimum speed of the door has not been reached.

When the door system is first started after the vehicle was not in operation the computer recognizes or picks up the end positions of the door. For this it is necessary that the open or closed position of the door is assigned to two voltage values of the linear motion sensor 1, 2, respectively. This eliminates the conventional limit switches 11, 12. The adjustment of the end positions is executed in the following manner for the door control according to the invention: When the door system is put on line a check is made first by means of a pressure switch 20, whether there is pressure. This is a condition for the fact that the door has assumed an end position. With this the corresponding voltage value of the linear motion sensor can be stored. Since the full angle of rotation of the door is known approximately, and there is a predetermined electrical voltage corresponding thereto, it is also possible to preset the other end position prior to the first movement of the door. Following the first movement of the door the end position is readjusted by means of measuring, i. e., the previous value in the memory is overwritten with the more accurate value. An end position is detected in this instance through the conditions "pressure present" and "no movement".

Furthermore, the computer can actualize in small steps the originally stored values for the standard door velocity. This is executed by overwriting with new values the memory content if differences occur between the actual and the controlled door speed. With this the control can adapt to changed kinematic conditions. In the event, however, that suddenly greater deviations in speed occur, the monitoring function connects once again.

When the system is first pressurized, as well as when it is repressurized following the actuation of the emergency cock, it is common practice to initially build up pressure via a throttle (not shown). This is to prevent the door from slamming because of lacking counter pressure in the door cylinders 4, 5. This results in greatly slowing down the first movement of the door. This operating condition is initially recognized by the electronics 3 with a pressure switch 20. In order to prevent the monitoring function from falsely reacting due to the too low door rate, the computer includes a second memory which stores the nominal door rates for throttled pressurization and substitutes this information for use in comparing to the actual door speed for startup conditions. In this manner this operating condition can be monitored as well.

As a result of the intelligence and adaptability of the door control as per the invention it is possible to achieve under all conditions imaginable a reliable and at the same time cost-efficient door control.

As seen in FIG. 3, the previously-discussed operating steps are represented in a flowchart-type diagram showing one example of the sequence by which the safety checks and adjustments due to changing climatic conditions can be achieved.

Having now described the invention what we claim as new and desire to secure by Letters Patent is:

1. A method for controlling the door drive system of a transportation vehicle, said door drive system having a fluid pressure supply, a shut-off valve, a door valve for directing such fluid pressure, a fluid drive cylinder for operating each door to effect door movement between an open and a closed position, and a linear motion sensor operably attached to said drive cylinder having an electrical output signal proportional to the position of said vehicle door, said control method comprising:
   (a) differentiating said electrical output signal thereby deriving the velocity signal which represents the change in position of the vehicle door as a function of time;
   (b) comparing said velocity signal to a predetermined standard velocity value as a function of door position and producing a difference signal therebetween;
   (c) initiating of a monitor mode when the velocity difference exceeds a predetermined value;
   (d) operating said door valve and said shut-off valve upon initiation of such monitor mode to cause said door to cease movement in the direction of travel and;
   (e) resetting a first end position value to the value of said electrical output signal upon sensing a zero door velocity and a pressurization condition of said drive cylinder, and resetting a second end position value by adding said reset first end position value to a predetermined value proportional to the full travel of said door.

2. A door control method as set forth in claim 1, wherein said electrical output signal differentiated for deriving said velocity value is an electrical voltage signal.

3. A door control method as set forth in claim 1, wherein said electrical output signal differentiated for deriving said velocity value is an electrical current signal.

4. A door control method as set forth in claim 1, further comprising: detecting a stationary condition of said door during a period when said door valve is conditioned to effect door movement and generating a delay signal proportional to the time of the door delay; comparing said delay signal to a predetermined allowable delay value; initiating such monitor mode when said delay exceeds said allowable delay value.

5. A door control method as set forth in claim 4, further comprising: differentiating of said velocity signal thereby deriving an acceleration signal; comparing said acceleration signal to a predetermined value; when said acceleration signal differs from said predetermined value by a predetermined amount, initiating a time period during which said delay signal is ineffective in initiating a monitor mode.

6. A door control method as set forth in claim 1, further comprising: sensing a throttling type pressurization and thereby substituting a second predetermined standard velocity value to use in calculating a throttled difference signal which is then used for initiating a monitor mode under throttled pressurization.

* * * * *